United States Patent
Gutierrez Ardanaz et al.

(10) Patent No.: US 12,203,450 B2
(45) Date of Patent: Jan. 21, 2025

(54) WIND TURBINE BLADE

(71) Applicant: Siemens Gamesa Renewable Energy Innovation & Technology S.L., Sarriguren (ES)

(72) Inventors: Roberto Gutierrez Ardanaz, Pamplona (ES); Victor March Nomen, Les Fonts (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 44 days.

(21) Appl. No.: 17/762,507

(22) PCT Filed: Oct. 1, 2020

(86) PCT No.: PCT/EP2020/077514
§ 371 (c)(1),
(2) Date: Mar. 22, 2022

(87) PCT Pub. No.: WO2021/069303
PCT Pub. Date: Apr. 15, 2021

(65) Prior Publication Data
US 2022/0412320 A1 Dec. 29, 2022

(30) Foreign Application Priority Data
Oct. 7, 2019 (EP) .................................. 19380025

(51) Int. Cl.
*F03D 80/40* (2016.01)
*F03D 1/06* (2006.01)

(52) U.S. Cl.
CPC ........... *F03D 80/40* (2016.05); *F03D 1/0658* (2013.01); *F03D 1/0675* (2013.01); *F05B 2240/30* (2013.01); *F05B 2280/6003* (2013.01)

(58) Field of Classification Search
CPC ...... F03D 80/40; F03D 1/0658; F03D 1/0675; F05B 2240/30; F05B 2280/6003
(Continued)

(56) References Cited

U.S. PATENT DOCUMENTS 6,145,787 A * 11/2000 Rolls ....................... F03D 1/065
416/223 R
6,612,810 B1 * 9/2003 Olsen ...................... F03D 80/40
415/908
(Continued)

FOREIGN PATENT DOCUMENTS

CN 206256999 U 5/2017
CN 207634252 U * 7/2018 ............... F03D 1/06
(Continued)

OTHER PUBLICATIONS

International Search Report & Written Opinion for PCT/EP2020/077514 mailed on Dec. 3, 2020.

*Primary Examiner* — Hung Q Nguyen
*Assistant Examiner* — Anthony Donald Taylor, Jr.
(74) *Attorney, Agent, or Firm* — Schmeiser, Olsen & Watts LLP

(57) ABSTRACT

Wind turbine blades with de-icing and/or anti-icing systems including at least one heating unit disposed along the blade's length and between the blade's chord, wherein each heating unit in turn comprises a plurality of heating elements connected both in series and in parallel in a matrix configuration by overlaps or cross-adjacent junctions between adjacent heating elements order to change the electric heating current flow disposing of any additional terminals cables and further enabling to generate a gradually increasing heat flux from the blade root towards the blade tip and from the trailing edge towards the leading edge through each individual heating unit adapting accurately to heat flux demand and (Continued)

hence reducing energy consumption for de-icing and/or anti-icing.

15 Claims, 5 Drawing Sheets

(58) Field of Classification Search
USPC .......................................................... 416/95
See application file for complete search history.

(56) References Cited

U.S. PATENT DOCUMENTS

| | | | | |
|---|---|---|---|---|
| 7,763,833 B2* | 7/2010 | Hindel | .................... | B64D 15/12 |
| | | | | 219/532 |
| 2005/0189345 A1* | 9/2005 | Brunner | ................. | B64D 15/12 |
| | | | | 219/548 |
| 2013/0022465 A1* | 1/2013 | Stiesdal | ................. | B64D 15/12 |
| | | | | 416/95 |
| 2013/0022466 A1* | 1/2013 | Laurberg | ................ | F03D 80/40 |
| | | | | 219/539 |
| 2013/0028738 A1* | 1/2013 | Nordin | .................... | F03D 80/30 |
| | | | | 416/39 |
| 2013/0170992 A1* | 7/2013 | Loewe | ................. | F03D 1/0675 |
| | | | | 29/611 |
| 2014/0086748 A1* | 3/2014 | Peltola | .................... | F03D 80/40 |
| | | | | 29/889.71 |

FOREIGN PATENT DOCUMENTS

| | | |
|---|---|---|
| EP | 2738383 A1 | 6/2014 |
| FR | 2 756 253 A1 | 5/1998 |
| WO | WO 2017108064 A1 | 6/2017 |

* cited by examiner

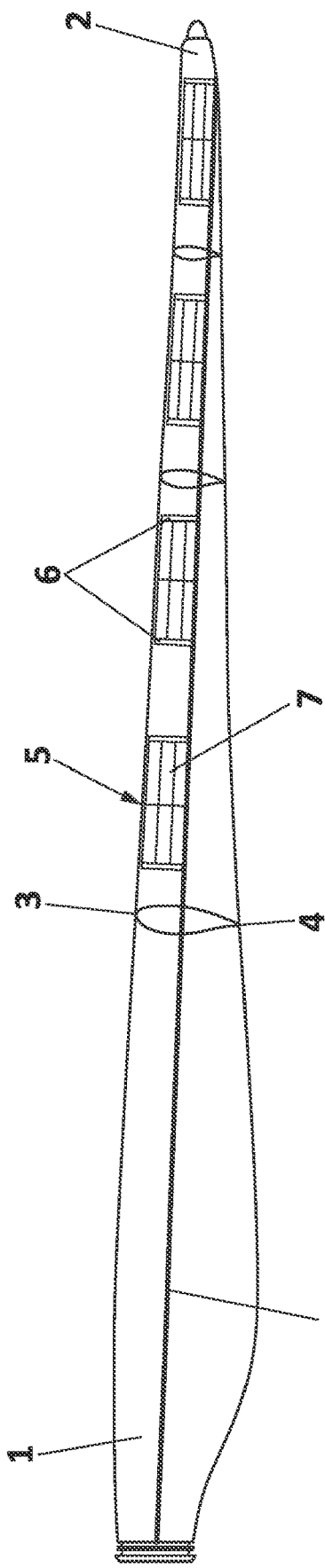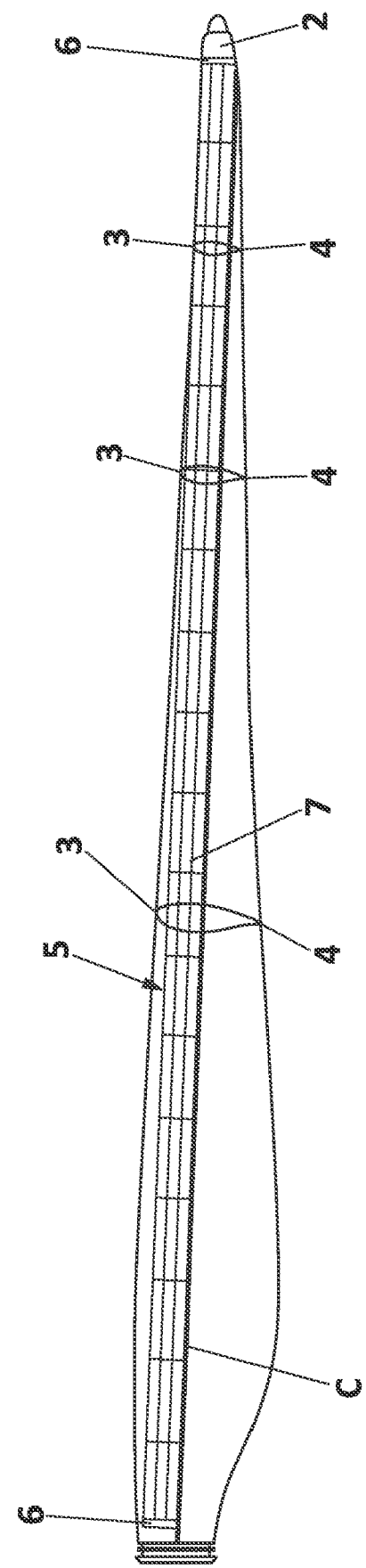
FIG. 2a
FIG. 2b

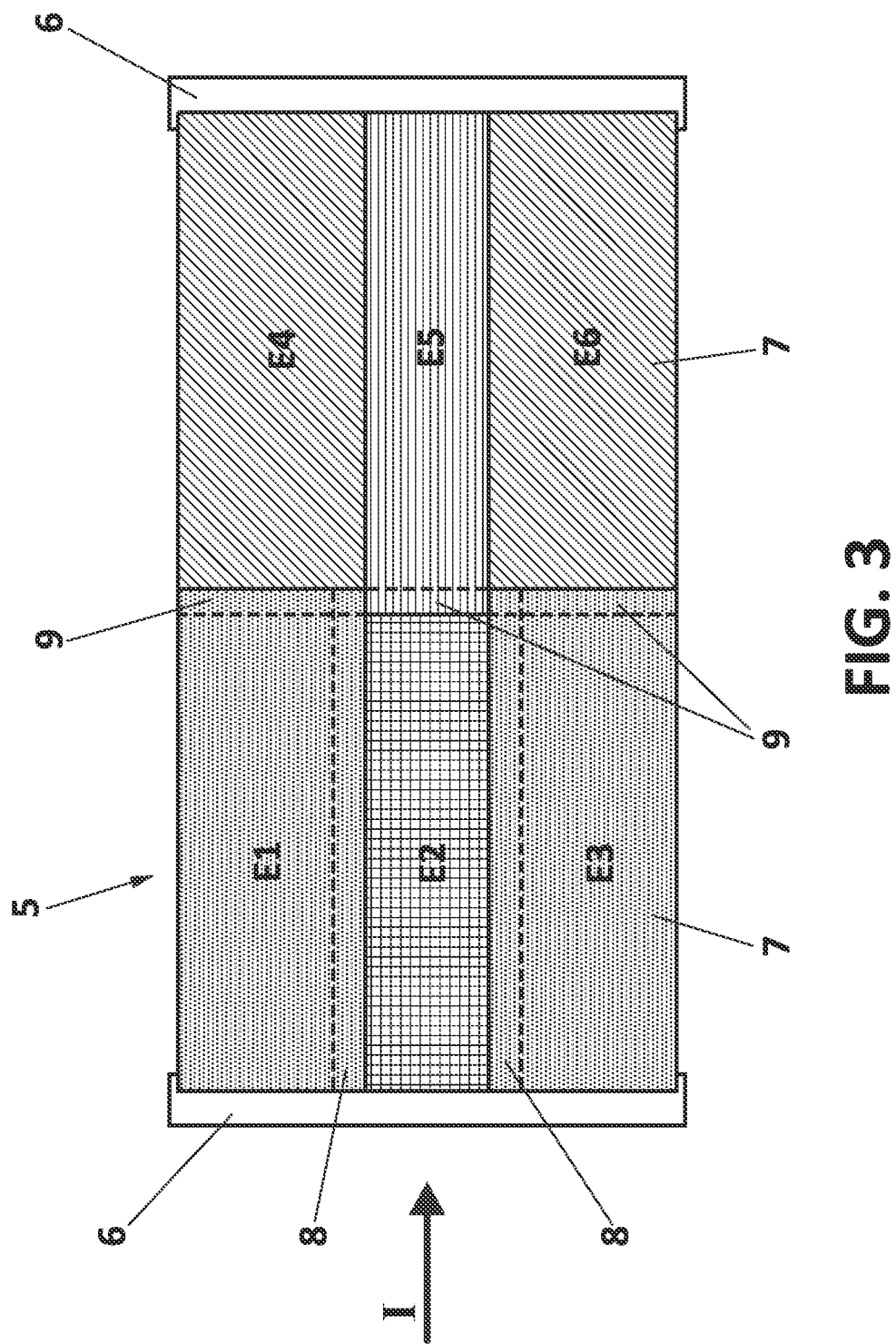

WIND TURBINE BLADE

CROSS-REFERENCE TO RELATED APPLICATIONS

This application claims priority to PCT Application No. PCT/EP2020/077514, having a filing date of Oct. 1, 2020, which claims priority to EP Application No. 19380025.7, having a filing date of Oct. 7, 2019, the entire contents both of which are hereby incorporated by reference.

FIELD OF TECHNOLOGY

The following is included in the technical field of wind turbine blades with de-icing and/or anti-icing systems. The following further relates to a wind turbine blade comprising at least one heating unit disposed along the blade's length and between the blade's chord, wherein each heating unit in turn comprises a plurality of heating elements connected both in series and in parallel in a matrix configuration by overlaps or cross adjacent junctions between adjacent heating elements.

The overlaps allow to change the electric heating current flow disposing of any additional terminals cables and further enabling to generate a gradually increasing heat flux from the blade root towards the blade tip and from the trailing edge towards the leading edge adapting more accurately to a specific heat flux demand and hence reducing energy consumption for de-icing or anti-icing.

BACKGROUND

Wind turbine blades are the core components used by modern wind turbines to capture wind energy. The aerodynamic characteristics of the blades have a crucial impact on the efficiency of wind turbines. When the wind turbine is operated in rainy or snowy weather or in a humid environment during the cold season, ice on the surface of the blade may occur. Icing will change the existing aerodynamic shape of the blade, which will cause harm to the safe operation of the wind turbine. After the surface of the blade freezes, its natural frequency changes, which causes the dynamic response behavior of the blade to change, which will cause interference to the control behavior of the control system. The integrity of the wind turbine structure itself is also affected by the frozen blades. The effects of imbalance or asymmetry increases the fatigue loads of the wind turbine.

By arranging a heating layer on the surface or inner layer of the blade, the blade can be heated to prevent ice from freezing on the surface when ice formation is to occur, or heating can be initiated after the surface has frozen to cause the ice layer on the surface to melt and achieve the purpose of deicing. The heating unit used in the existing heating anti-icing system is either uniformly disposed on the surface of the blade or divided into several heating zones along the length direction.

The required heat power demand per square meter is different along the blade being lower at shorter radiuses near the root of the blade and higher as the radius approaches the tip of the blade. Likewise, the required heat flux is higher closer to the leading edge and decreases gradually towards the trailing edge.

Furthermore, it may be found that the surface to be heated covers the leading edge until a certain distance towards the trailing edge, and that this distance may not be constant along the blade.

As consequence, the electrical power to be released for de-icing or anti-icing systems should be accurately optimized to the demanded heat at each portion of the blade to yield a higher efficiency for the heating system and hence lower energy consumption, delivering more energy output to the grid. For example, the power to be released in cold climate conditions may reach values up to tens of kilowatts in severe temperatures below $-5°$ C. Optimized de-icing or anti-icing solutions may reduce the released power significantly up to about 20-50%.

Some systems for this purpose are known in the state of the art. For example, European document EP2738383A1 discloses a solution for modifying the width of the resistance—carbon fabric—from the root of the blade to the tip, so as to increase the heating power along the blade. However, in this solution the surface to be heated may not fit with the corresponding heat flux demand, and even if the surface is fitted to the needs for deicing, then the heat flux may not be perfectly adjusted to the required heat flux demand. Only changing the width may not match accurately the gradual heat flux demand, neither in the blade radial direction nor in the blade chord direction.

Other solutions comprise the use of multiple resistors and to feed the different resistors at different voltages, so that the different resistors having the same electrical resistance receive different current. The problem of this is that the number of wiring increases to feed the different resistors.

Other solutions disclose modifying the resistors disposed in parallel to adjust to the different required heat flux demands along the blade with an equal input voltage to all resistors. However, this solution does not gradually increase the heat surface density along each single resistor, losing efficiency along the longitudinal direction of each single resistor. Moreover, layers may be connected to take into account the heat flux demand along the chord, from the leading edge to the trailing edge, but in that case more resistor terminals would be required, increasing proportionally as the number of layers increase. Taking into account that each resistor terminal may be connected to a conductor from inside the blade inner surface, this is a significant disadvantage.

SUMMARY

A wind turbine blade is disclosed herein with which it has been found that at least the above disadvantages relating to the conventional art solutions are mitigated.

An aspect relates to a wind turbine blade comprising a blade root, a blade tip, a leading edge, a trailing edge, and further comprising:
at least one heating unit comprising two terminals, adapted to be fed by an electric heating current and disposed between the blade root and the blade tip and between the leading edge and the trailing edge,
wherein each heating unit comprises a plurality of heating elements arranged both in parallel and in series in a matrix configuration by at least one string overlap between adjacent heating elements connected in series and at least one cross-adjoining junction between adjacent heating elements connected in parallel.

By connecting the plurality of heating elements by overlaps, the electric heating current flow is able to change without adding more terminal cables. Taking into account that each resistor terminal may be connected to a conductor from inside the blade inner surface, this is a significant advantage for ease of assembly.

Furthermore, the plurality of heating elements can be connected in parallel and in series, wherein changing the number of rows or columns in the matrix configuration each heating unit is able to adapt to a heating flux demand in each longitudinal section and cross-sectional section along each single heating unit and simultaneously eliminating the need to add additional terminal cables for each layer or piece of heating element "overlapped" in parallel or in series.

Moreover, it may be achieved more accurately by changing each the particular resistance of every single heating element depending on the configuration of the matrix so that each heating unit is able to be configured to generate a highly accurate increasing heat flux from the blade root towards the blade tip and from the trailing edge towards the leading edge in each single heating unit, adapting accurately to the heating requirement in each section of the blade, thus reducing the energy consumption of the wind turbine and increasing the energy yield.

In an embodiment, the overlapped areas may be accomplished with a simple overlap. Hence, the cross-adjoining junction may be a cross overlapped area between heating elements. Alternatively, the cross-adjoining between heating elements may be a distance apart to each other or directly adjacent at no distance or overlapped.

Hence, the two heating elements connected in parallel may be placed overlapped, directly adjacent, or even with a distance apart of some millimeters between them. In an embodiment, this distance may be between 0 to 50 mm.

Alternative, for the embodiment of cross overlaps between heating elements connected in parallel, the cross overlaps may have a length between 0 and 20 cm. In an embodiment, the cross overlap may have a length in the range of 0-3 cm.

Overlaps in longitudinal direction respect to the electrical current flow—string overlaps—may require the use of an additional conductive element which may overlap adjacent heating elements. This additional conductive element may have the geometry of a tape or equivalent geometry, to join two heating elements by overlapping both of them. The use of the additional conductive element could also be feasible for cross overlapped heating elements.

The string overlap which can be defined as the overlap area for heating elements connected in series may comprise a length of at least 0.5 cm.

Every individual heating element comprised in a heating unit may vary each the parameters of material, thickness, length and/or width to change each particular resistance to adapt to the flux demand, i.e., generate an accurate and gradually increasing heating flux from the blade root to the blade tip and from the trailing edge to the leading edge.

Any combination of changes to the parameters could be performed to optimize and adapt more accurately to the exact heat flux demand at each singular section of the blade.

The electric heating current may be applied in a longitudinal direction in relation to the blade. In this case, each heating unit may have a higher resistance towards the blade tip as heating elements are connected in series by overlaps, and a lower resistance towards the blade leading edge as in this case heating elements are connected in parallel.

Alternatively, the electric heating current may be applied also in a cross-sectional direction to the blade. Therefore, in other words, the heat unit terminals can be installed in a longitudinal or a radial direction of the blade.

Furthermore, the wind turbine blade may further comprise more than one heating unit disposed along the blade. In an embodiment, the plurality of heating units are connected in parallel with the same input voltage.

Note, that in this solution the resistance of each heating unit should decrease longitudinally to increase the heating power but every single electrical unit would also provide a gradual variation of the heat flux along the chord and along the longitudinal direction of the blade, adapting accurately to the demanded heat flux and hence increasing heat power efficiency and hence decreasing energy consumption for de-icing or anti-icing. Furthermore, without the requirement of installing additional terminal cables with the inconvenience of being connected to conductors inside the blade inner surface.

For the solutions above, in the case the neutral cable is also used as the lightning protection system cable in a smart wind turbine blade, only one additional conductor may be needed to feed all heating units, more running along from the blade root to the final heating unit installed, providing the same voltage to all the heating units installed along the blade Alternatively, if the neutral cable is not also the lighting protection system cable, only two additional conductors may be needed to feed the heating units.

Higher number of conductors may be allowed which may lead to a better control of the surface power density or heat flux along the blade. Hence, each heating unit may be fed individually with different voltages. In this case, still the gradient of heat flux along the chords and radial direction through every single heating unit is achieved, and may lead to a higher accuracy and hence efficiency but at the expense of more conductor cables and ease of assembly to connect more terminals cables with inner surface conductors.

In an embodiment, the heating elements are conductive fabric composite or paint.

BRIEF DESCRIPTION

Some of the embodiments will be described in detail, with reference to the following figures, wherein like designations denote like members, wherein:

FIG. 2a illustrates a schematic view of a first preferred configuration clearly showing a plurality of heating units disposed along the blade longitudinal direction;

FIG. 2b illustrates a schematic view of a second preferred configuration clearly showing one single heating unit disposed along the blade longitudinal direction;

FIG. 3 illustrates a first preferred embodiment of a heating unit clearly showing six heating elements connected in series and in parallel by string overlaps and cross-adjoining junctions respectively;

DETAILED DESCRIPTION

Figure 1:
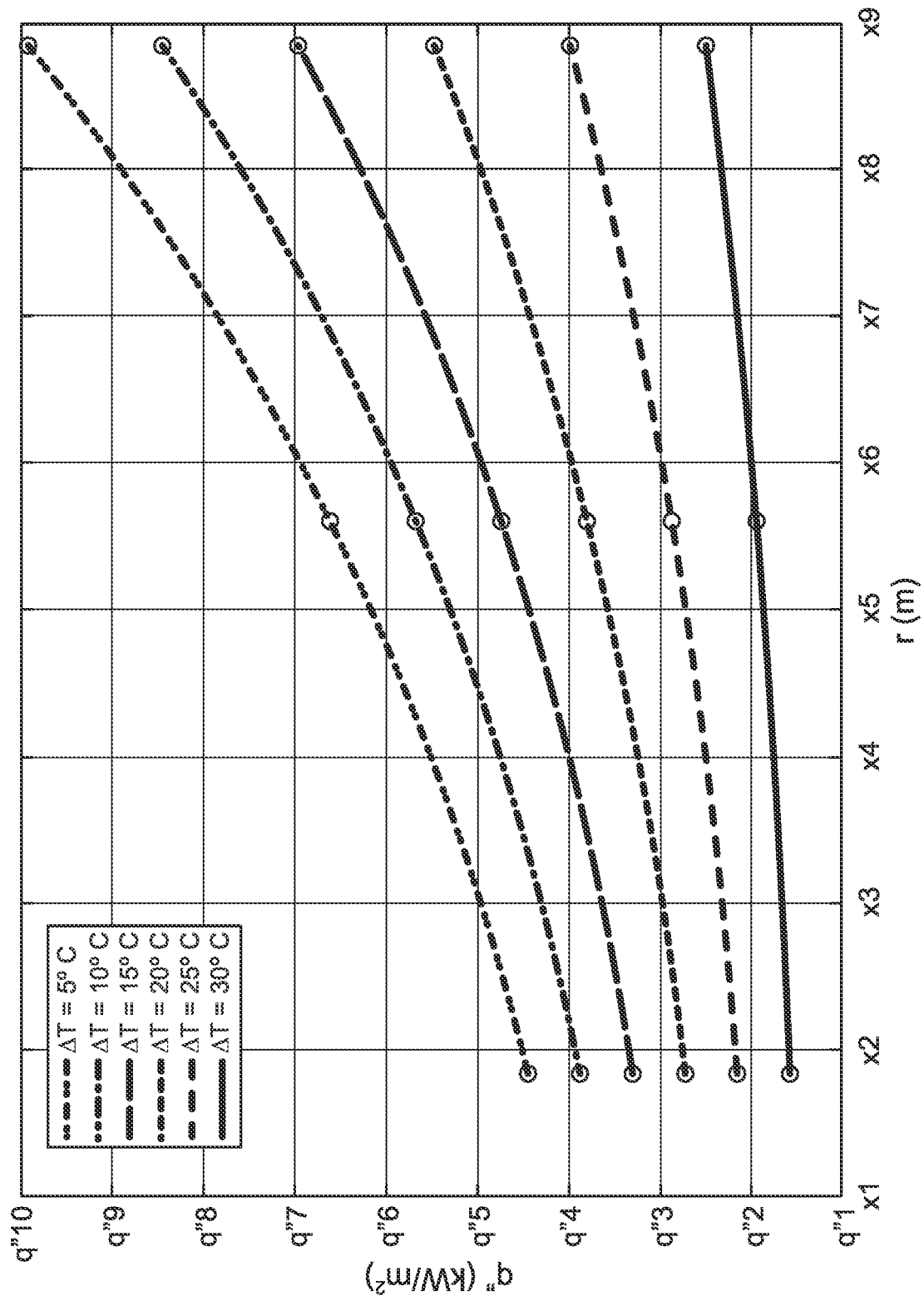
FIG. 1 illustrates a graph showing the thermal losses along the radius of a conventional wind turbine blade for a plurality of temperature increases.

FIG. 1 illustrates a graph showing the thermal losses along the radius of a conventional wind turbine blade for a plurality of temperature increases. Therefore, it can be seen how the heat flux demand and hence in turn the exact heat flux that should be generated ideally varies gradually as the radius of the blade increases.

Additionally, the heat flux demand increases gradually from the trailing edge until the leading edge (not shown) and further, it may be found that the surface to be heated covers the leading edge until a certain distance towards the trailing edge, and the distance may not be constant along the blade.

Thus, it is illustrated the significance importance of optimizing the heat flux generated along each single section of the radius of the blade and along its chord in each single section of the blade to reduce the energy consumption for de-icing and anti-icing.

FIG. 2a illustrates a schematic view of a first preferred configuration clearly showing a wind turbine blade comprising a blade root (1), a blade tip (2), a leading edge (3), a trailing edge (4).

FIG. 2a also illustrates that the wind turbine blade comprises a plurality of heating unit (5) comprising two terminals (6), adapted to be fed by an electric heating current by a conductor (C) and wherein each heating unit (5) is disposed along the longitudinal direction, between the blade root (1) and the blade tip (2) and between the leading edge (3) and the trailing edge (4), Additionally, FIG. 2a illustrates that each heating unit (5) comprises a plurality of heating elements (7).

FIG. 2b illustrates a schematic view of a second preferred configuration clearly showing that the wind turbine blade comprises a single heating unit (5) extended until the blade tip (2).

FIG. 3 illustrates a detailed schematic view of a first preferred embodiment of a single heating unit (5) according to the first configuration described above. This is with a plurality of heating units (5) along the blade.

FIG. 3 clearly shows a single heating unit (5) comprising six heating elements (7) arranged both in parallel and in series in a matrix configuration by string overlaps (9) between adjacent heating elements (7) connected in series and by cross-adjoining junctions (8) between adjacent heating elements (7) connected in parallel.

The heating unit (5) described in FIG. 3, is able to change the electric heating current flow (I) without including extra terminal cables. This is a significant advantage as every terminal cable should be connected to a conductor located at inner surface of the blade, which causes great inconvenience for assembly the heating system to a wind turbine blade.

Additionally, by changing the resistance of each heating element (7) the heating unit (4) is further able to generate accurately an increasing heat flux from the blade root (1) towards the blade tip (2) and from the trailing edge (4) towards the leading edge (3) through each heating unit (5). That is, along the longitudinal direction of blade and along the chord.

In a first embodiment shown in FIG. 3, this is achieved by changing the material and/or the geometry of heating element (5) and therefore modifying its resistivity and as a consequence its resistance.

In a first embodiment heating elements E1 and E3 are made of the same material, likewise are E4 and E6, but of different materials between each group thereof. Heating elements E2 and E5 comprise each else another different material. Therefore, linear resistivity and hence resistance is changed and optimized according to desired heat flux at a precise radius and chord portion of the blade.

Additionally, the width of the elements is also varied, in particular the width of elements E2 and E5 is reduced in relation to the width of elements E1, E3, E4 and E6. Again, with the object of optimizing the required heat flux demand at each precise portion of the blade.

Note, that optimizing the resistance of every individual heating element (7) according to the specific configuration, the heating flux can be accurately optimized through every single heat unit (5) and as a consequence more accurately optimized along the longitudinal and cross-sectional direction of the blade.

FIG. 3 also shows that the cross-adjoining junction (8) between elements E1 and E4 with E2 is a cross overlap while the cross-adjoining junction (8) between elements E4 and E6 with E5 is an adjacent junction with no distance apart or overlap thereof.

Figure 4:
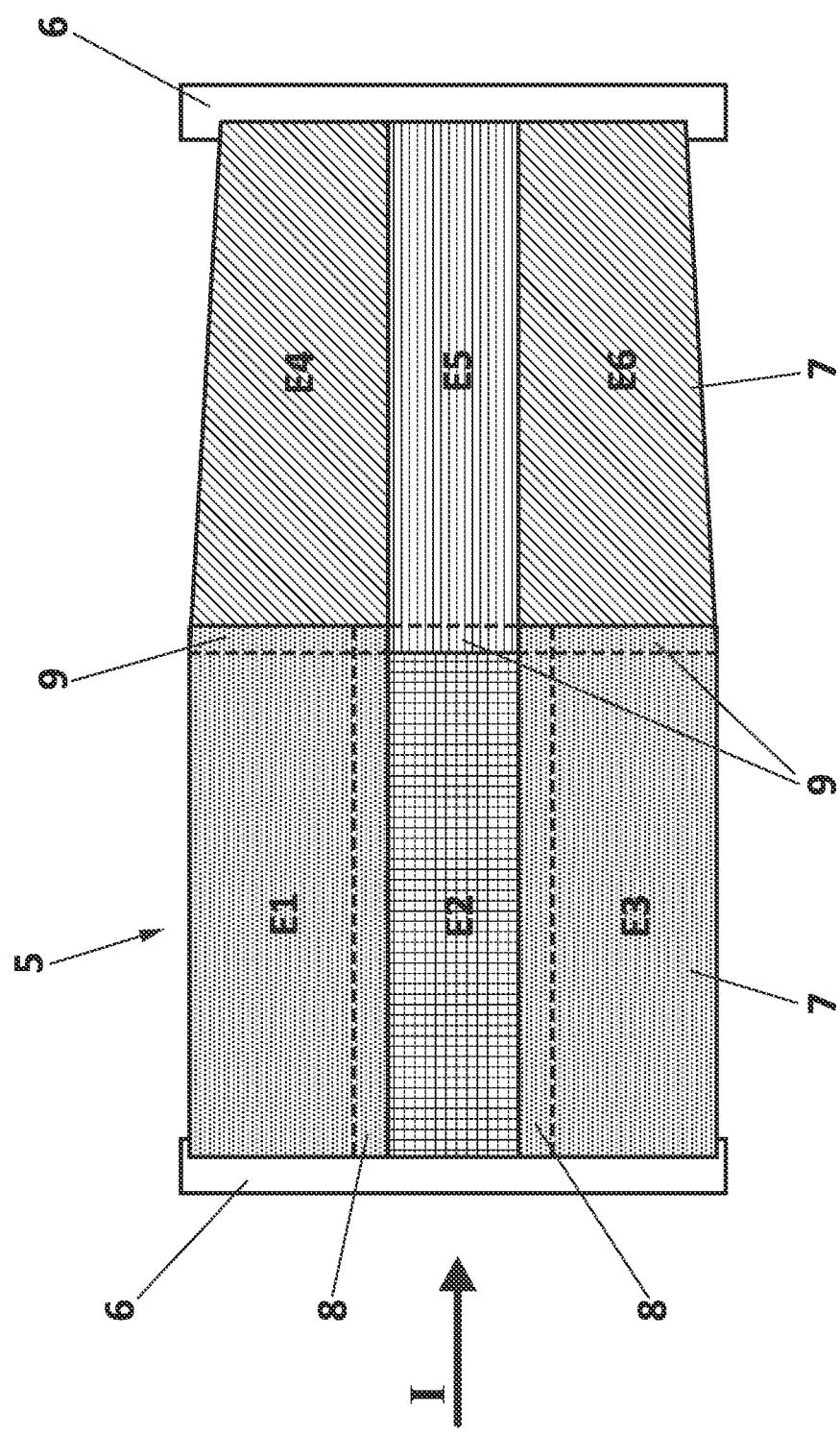
FIG. 4 illustrates a second preferred embodiment of a heating unit clearly showing six heating elements with variable width and material.

FIG. 4 illustrates a detailed schematic view of a second preferred embodiment of a single heating unit (5) according to the first configuration previously described.

FIG. 4 clearly shows six heating elements (7) arranged both in parallel and in series in a matrix configuration by string overlaps (9) between adjacent heating elements (7) connected in series and by cross-adjoining junctions (8) between adjacent heating elements (7) connected in parallel.

In this second embodiment shown in FIG. 4, the width of the heating elements E4 and E6 linearly decreases along the length of the heating elements (7) thereof, thus increasing the resistance as the width shortens.

Furthermore, heating elements E1 and E3 are made of the same material, likewise to E4 and E6 but different materials or geometry between each other thereof. Heating elements E2 and E5 comprise each else another different material or geometry to the previously mentioned.

Additionally, in FIG. 4, it is shown that the cross-adjoining junction of E4 and E6 with E5 is of 0 mm. Nevertheless, note that even a separation of a distance apart of some millimeters could be feasible for cross-adjoining junctions (not illustrated).

Figure 5:
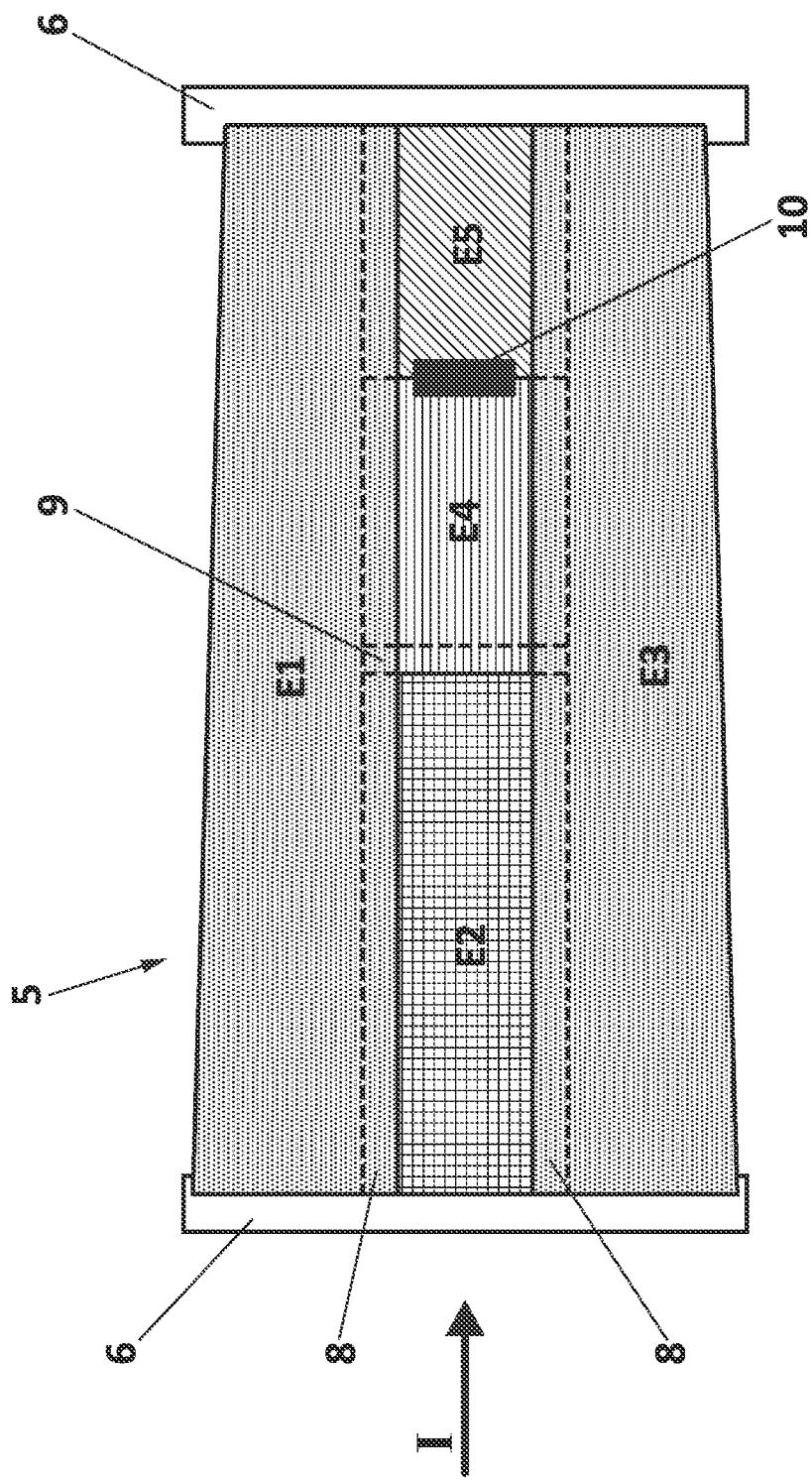
FIG. 5 illustrates a third preferred embodiment of a heating unit clearly showing six heating elements wherein the width of two single elements is variable along its length.

FIG. 5 illustrates another preferred embodiment of a heating unit (5). It can be seen from FIG. 5, that the matrix configuration does not need to have an equal number of rows and columns.

FIG. 5 shows heating element E1 and E3 directly connected to the terminals (6) and wherein the width of the heating elements E1 and E3 is reduced linearly along its corresponding length. Furthermore, the heating elements E1 and E3 have the same material and resistivity and in turn are overlapped to elements E2, E4 and E5 which in turn each comprise else different material and length.

FIG. 5 also shows an additional conductive element (10) which overlap both heating elements E4 and E5. This may be accomplished by a metallic mesh or any other conductive sheet, fabric or mesh between two strings overlapped (8) heating elements (7). The use of a metallic mesh between two overlapped heating elements (7) can only be applied for those in transversal direction respect the electrical current flow, this is for string overlapped (9) t heating elements (7).

Note that in any of the embodiments described, the heat flux can be optimized along every single heat unit (5) and hence able to achieve an extremely accurate gradual heat flux along each individual portion of the blade to adapt to the heating flux ideally demanded. In other words, by modifying the amount of heating elements (5) in series and in parallel, thus the matrix configuration, and further modifying the material, the width and/or the thickness of every heating element (5), a very accurate profile of the heat flux to be generated along the blade can be achieved adapting very accurately to the ideal heat flux demand. Thus, the energy consumption for de-icing and anti-icing can be greatly reduced and consequently energy yield and production to the grid greatly increased. This is achieved without increasing the number of terminal cables (6) for each heating unit (5).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade comprising:
   a blade root;
   a blade tip;
   a leading edge;
   a trailing edge; and
   at least one heating unit comprising two terminals, the at least one heating unit disposed between the blade root and the blade tip and between the leading edge and the trailing edge, and configured to be fed by an electric heating current;
   wherein the at least one heating unit comprises a plurality of heating elements arranged both in parallel and in series in a matrix configuration between the two terminals, such that one or more first heating elements of the plurality of heating elements are connected in series to one or more adjacent second heating elements of the plurality of heating elements by at least one string overlap and connected in parallel to one or more adjacent third heating elements of the plurality of heating elements by at least one cross-adjoining junction,
   wherein the one or more first heating elements are comprised of a different material and have a different geometry than at least one of the one or more adjacent second heating elements and the one or more adjacent third heating elements, thereby enabling an accurately increasing heat flux to be generated from the blade root towards the blade tip and from the trailing edge towards the leading edge through the at least one heating unit.

2. The wind turbine blade according to claim 1, wherein the at least one string overlap comprises a length of 0.5-20 cm.

3. The wind turbine blade according to claim 2, wherein the at least one string overlap comprises a length of 1-3 cm.

4. The wind turbine blade according to claim 1, further comprising at least one conductive element overlapping any two adjacent heating elements of the plurality of heating elements that are connected in series, the at least one conductive element applied in a transversal direction of the at least one heating unit with respect to a flow direction of the electric heating current.

5. The wind turbine blade according to claim 1, wherein the at least one cross-adjoining junction comprises a length of 0.5-3 cm.

6. The wind turbine blade according to claim 1, wherein the at least one cross-adjoining junction defines a distance between at least two adjacent heating elements of the plurality of heating elements, the distance comprising a length between 0 to 50 mm.

7. The wind turbine blade according to claim 1, wherein each heating element of the plurality of heating elements comprises one or more of: a width, a length, a thickness and a resistivity.

8. The wind turbine blade according to claim 1, wherein the electric heating current is applied in a longitudinal direction of the at least one heating unit.

9. The wind turbine blade according to claim 8, wherein the at least one heating unit has a higher resistance towards the blade tip.

10. The wind turbine blade according to claim 8, wherein the at least one heating unit has a lower resistance towards the leading edge.

11. The wind turbine blade according to claim 1, wherein the electric heating current is applied in a transversal direction of the at least one heating unit.

12. The wind turbine blade according to claim 1, wherein the at least one heating unit comprises a plurality of heating units disposed along the wind turbine blade.

13. The wind turbine blade according to claim 12, wherein each heating unit of the plurality of heating units is fed individually with different voltages.

14. The wind turbine blade according to claim 1, wherein the plurality of heating elements are conductive fabric composite or paint.

15. The wind turbine blade according to claim 1, wherein the heating elements connected in parallel by the at least one cross-adjoining junction are directly adjacent to each other or overlapping each other along a length of the heating elements.

* * * * *